United States Patent
Chang et al.

(10) Patent No.: US 11,271,482 B2
(45) Date of Patent: Mar. 8, 2022

(54) DC-DC CONVERTER AND DC-DC CONVERTER OPERATION METHOD

(71) Applicant: Taiwan Semiconductor Manufacturing Co., Ltd., Hsinchu (TW)

(72) Inventors: Chia-Chun Chang, Taoyuan County (TW); Alan Roth, Leander, TX (US); Eric Soenen, Austin, TX (US); Ying-Chih Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 108 days.

(21) Appl. No.: 16/805,871

(22) Filed: Mar. 2, 2020

(65) Prior Publication Data
US 2020/0412251 A1    Dec. 31, 2020

Related U.S. Application Data

(60) Provisional application No. 62/867,867, filed on Jun. 28, 2019.

(51) Int. Cl.
*H02M 3/158*    (2006.01)

(52) U.S. Cl.
CPC ................ *H02M 3/1588* (2013.01)

(58) Field of Classification Search
CPC .. H02M 3/1588; H02M 1/385; H02M 1/0054; H02M 1/0009; H02M 1/0048; H02M 1/08; H02M 3/158; H02M 1/38; Y02B 70/10
See application file for complete search history.

(56) References Cited

U.S. PATENT DOCUMENTS

| | | | | |
|---|---|---|---|---|
| 2008/0061750 A1* | 3/2008 | Stoichita | ............. | H02M 3/1563 323/271 |
| 2009/0027020 A1* | 1/2009 | Qiu | ..................... | H02M 3/1588 323/282 |
| 2009/0160412 A1* | 6/2009 | Latham | ............... | H02M 3/1588 323/282 |
| 2009/0273326 A1* | 11/2009 | Lipcsei | ............... | H02M 3/1588 323/282 |
| 2010/0019749 A1* | 1/2010 | Katsuya | .................. | H02M 1/15 323/282 |
| 2010/0283441 A1* | 11/2010 | Wang | .................. | H02M 3/1588 323/282 |

(Continued)

*Primary Examiner* — Kyle J Moody
(74) *Attorney, Agent, or Firm* — JCIPRNET

(57) ABSTRACT

A DC-DC converter and a DC-DC converter operation method are provided. The DC-DC converter includes a power stage, an error amplifier, a pulse width modulation (PWM) generator, and a gate controller. The power stage includes a first transistor and a second transistor. The voltage dividers are configured to perform a voltage division on a first node of the power stage and a second node to generate a first voltage and a second voltage. The first node is an output node of the DC-DC converter and the second node is a node between the first transistor and the second transistor of the DC-DC converter. The comparator is configured to compare the first voltage and the second voltage to generate a turn-on time signal of the first transistor according to a comparison result.

19 Claims, 8 Drawing Sheets

(56) References Cited

U.S. PATENT DOCUMENTS

| | | | |
|---|---|---|---|
| 2012/0299565 A1* | 11/2012 | Zhang | H02M 3/1588 323/282 |
| 2013/0021008 A1* | 1/2013 | Hume | H02M 3/1588 323/271 |
| 2015/0042299 A1* | 2/2015 | Li | H02M 3/06 323/271 |
| 2020/0119649 A1* | 4/2020 | Uno | H02M 3/1588 |
| 2021/0083583 A1* | 3/2021 | Becker | G05F 3/262 |

* cited by examiner

DC-DC CONVERTER AND DC-DC CONVERTER OPERATION METHOD

CROSS-REFERENCE TO RELATED APPLICATION

This application claims the priority benefit of U.S. provisional application Ser. No. 62/867,867, filed on Jun. 28, 2019. The entirety of the above-mentioned patent application is hereby incorporated by reference herein and made a part of this specification.

BACKGROUND

In a DC-DC converter, a well timing gate control is preferred to minimize a dead-time during a power MOS switching, which reduces a power loss during a body diode conduction. By using a sample/hold circuit to detect the deadtime, which in turn leads to leakage at a low switching frequency. In another aspect, pre-calibration of the DC-DC converter is established to minimize the dead time, but the dead time might vary with respect to large input voltage and varying load conditions. In addition, pre-calibration of the DC-DC converter needs additional pins, which increases a packaging cost. In some architectures, controlling the dead time by sensing a gate voltage of an output stage, results in reserving a guard band for sensing may leads to increasing the dead time.

Therefore, there is a need to design the well timing gate control in the DC-DC converter with the minimum dead time during the power MOS switching.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
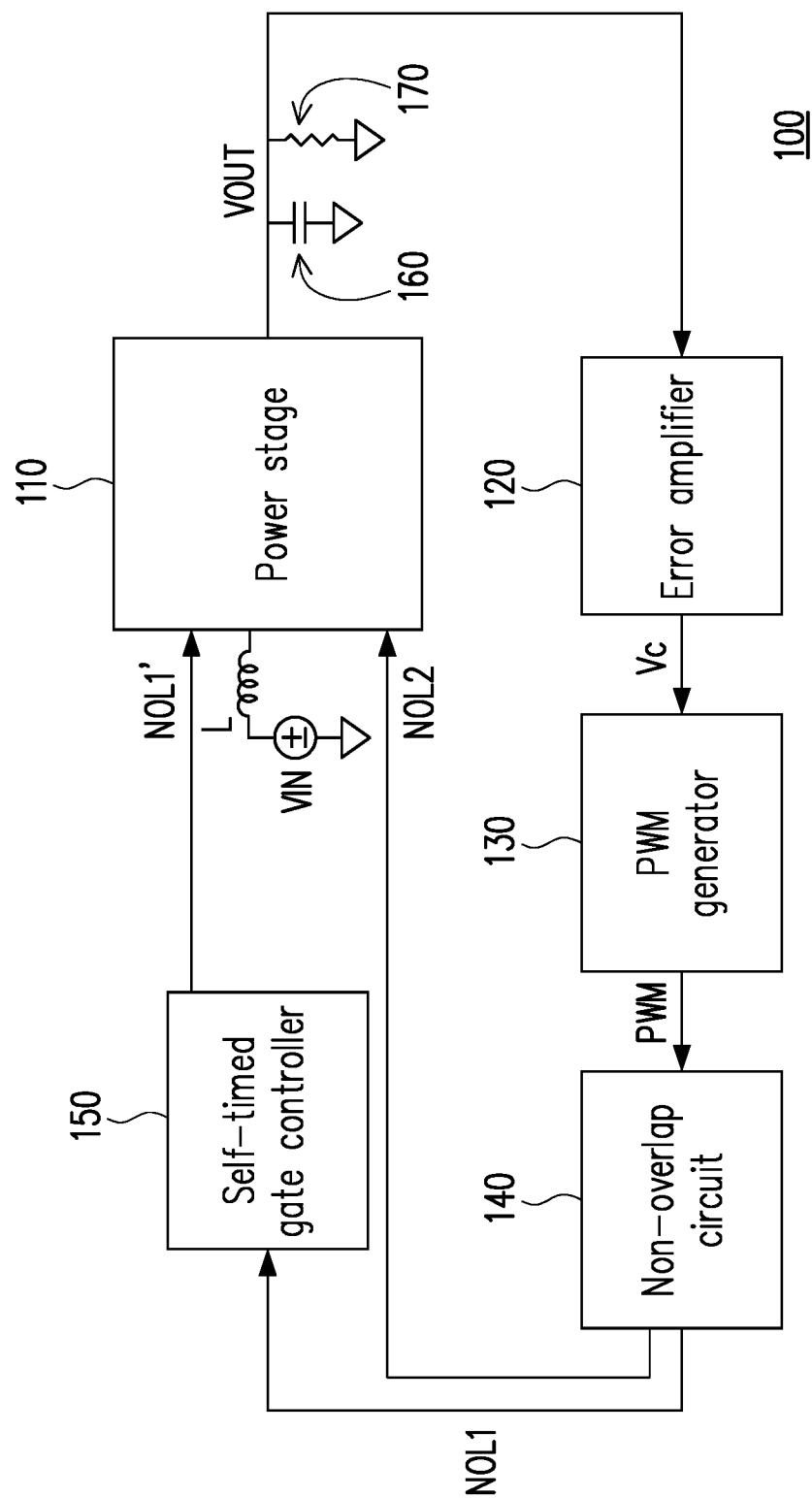
FIG. 1 illustrates a block diagram of a DC-DC converter according to an exemplary embodiment of the disclosure.

The following disclosure provides many different embodiments, or examples, for implementing different features of the present disclosure, Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a block diagram of a DC-DC converter according to an exemplary embodiment of the disclosure. The DC-DC converter 100 includes a power stage 110, an error amplifier 120, a PWM generator 130, a non-overlap circuit 140, a gate controller 150, an output capacitor 160 and a load resistor 170. In the embodiment, the gate controller 150 is also referring to an self-timed gate controller 150.

In some embodiments, the power stage 110 may include a first transistor and a second transistor (not shown). The first transistor is a high side switch HS and a low side switch LS. The high side switch HS and the low side switch are NMOS transistors. The high side switch HS and the low side switch LS includes a source terminal, a drain terminal and a gate/control terminal.

The source terminal of the high side switch HS is coupled to the drain terminal of the low side switch SW. The drain terminal of the high side switch HS is connected to an output node VOUT of the DC-DC converter. The gate terminal of the high side switch HS receives the control signal from the self-timed gate controller 150.

Similarly, the source terminal of the low side switch LS is coupled to a ground potential GND of the DC-DC converter. The gate terminal of the low side switch LS receives a second non-overlap signal NOL2 from the non-overlap circuit 140. Those applying this embodiment may adjust the circuit structure of the power stage 110 according to requirements, and circuit structure of the power stage 110 do not be limited.

In some embodiments, the high side switch HS is a PMOS transistor and the low side switch is the NMOS transistor, thus the type of transistor used as the high side switch HS is not limited in this disclosure.

The power stage 110 further includes an inductor L. The inductor L has a first terminal and a second terminal. The first terminal of the inductor L receives a power supply Vin, wherein Vin is a global power supply for the DC-DC converter 100. The second end of the inductor L is coupled to the drain terminal of the low side switch LS and the source terminal of the high side switch HS. The node connecting the second end of the inductor L and source terminal of the high side switch HS and the drain terminal of the low side switch is an inductor switching node LX.

In some embodiments, the high side switch HS is replaced with a diode (not shown). The diode may be any type of diode that includes an anode and a cathode. The second terminal of the inductor L is coupled to the drain terminal of the low side switch LS and the anode of the diode. The cathode of the diode is coupled to the output node VOUT of the DC-DC converter.

The output node of the power stage 110 is coupled to the output capacitor 160 and the load resistor 170.

The output capacitor 160 includes a first terminal and a second terminal. The first terminal of the output capacitor 160 is connected to the output node VOUT of the DC-DC converter and the second terminal of the output capacitor 160 is connected to the reference node (i.e., the ground potential GND).

The load resistor 170 includes a first terminal and a second terminal. The first terminal of the load resistor 170 is connected to the output node VOUT of the DC-DC converter and the second terminal of the load resistor 170 is connected to the ground potential GND.

In short, the drain terminal of the high side switch HS is coupled to the output capacitor 160 and the load resistor 170. The node that connects the drain terminal of the high side switch HS, the first terminal of the output capacitor 160 and the first terminal of the load resistor 170 is the output node VOUT of the DC-DC converter.

The error amplifier 120 is configured to receive an output from an output node VOUT and generates an error signal Vc. In detail, the error amplifier 120 receives the output from the output node VOUT, generates a difference of the voltage level of the output node VOUT and a voltage level of a preset voltage and amplifies the difference to generate the error signal Vc for presenting the difference of the voltage levels of the output node VOUT and the preset voltage.

The PWM generator 130 is configured to receive the error signal Vc and generates a pulse width modulation signal PWM. Pulse width modulation (PWM) is a method or a signal processing way of reducing the average power delivered by an electrical signal (i.e., the error signal Vc), by effectively chopping it up into discrete parts. In the embodiment, the PWM generator 130 generates a high side pulse width modulation signal PWM HS and a low side pulse width modulation signal PWM LS according to the error signal Vc. In some embodiments, the high side pulse width modulation signal PWM HS is to drive the high side switch HS and the low side pulse width modulation signal PWM LS is to drive the low side switch LS.

The non-overlap circuit 140 is configured to receive the PWM signal (i.e, the high side pulse width modulation signal PWM HS) from the PWM generator 130 and generates a first non-overlap signal NOL1 and the second non-overlap signal NOL2. The first non-overlap signal NOL1 is to drive the high side switch HS according to the high side pulse width modulation signal PWM HS, and the second non-overlap signal NOL2 is to drive the low side switch LS according to the low side pulse width modulation signal PWM LS. It is noted that, the first non-overlap signal NOL1 and the second non-overlap signal NOL2 do not overlap each other.

The self-timed gate controller 150 is configured to receive the first non-overlap signal NOL1 and generates a turn-on time signal NOL1' of the high side switch HS.

Based on the controlling the turn-on time signal NOL1' of the high side switch HS by the self-time gate controller, the dead-time of the DC-DC converter is minimized, thus improving the power efficiency of the DC-DC converter by reducing an overshoot and an undershoot switching loss during a power MOS switching. The chip size of the DC-DC converter of the embodiment may be small and the number of control pins in the DC-DC converter of the embodiment may be reduced without the control pins for adjusting the high side pulse width modulation signal PWM HS in the DC-DC converter.

Figure 2:
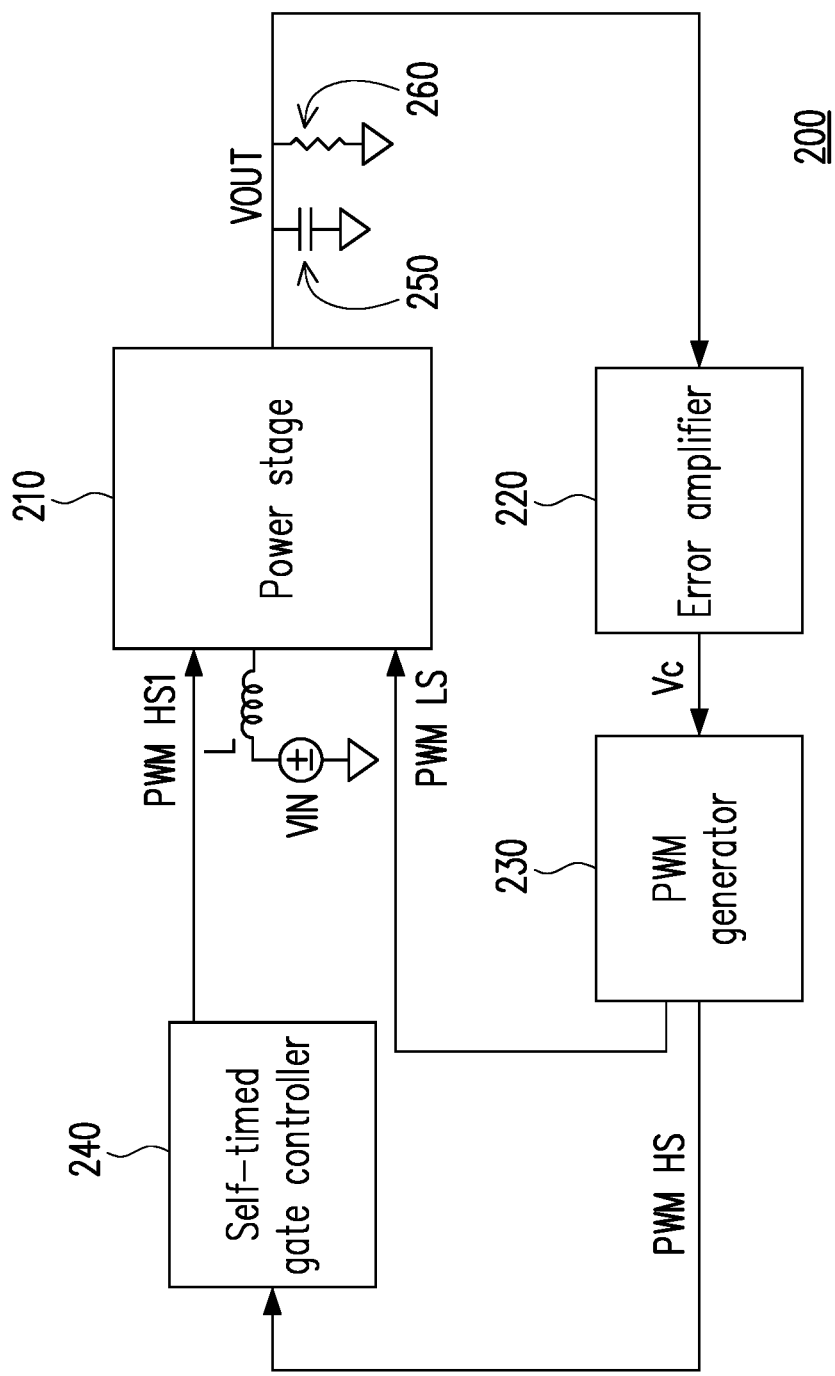
FIG. 2 illustrates a block diagram of a DC-DC converter according to an exemplary embodiment of the disclosure.

FIG. 2 illustrates a block diagram of a DC-DC converter according to an exemplary embodiment of the disclosure. The DC-DC converter 200 includes a power stage 210, an error amplifier 220, a PWM generator 230, a self-timed gate controller 240, an output capacitor 250 and a load resistor 260. Same elements in FIG. 2 have the same reference numbers as the DC-DC converter 100 in FIG. 1.

The power stage 210, the error amplifier 220, a PWM generator 230, the self-timed gate controller 240, the output capacitor 250 and the load resistor 260 are respectively similar to a power stage 110, an error amplifier 120, a PWM generator 130, a self-timed gate controller 150, an output capacitor 160 and a load resistor 170.

The power stage 210 may include a first transistor and a second transistor. The first transistor is a high side switch HS and a low side switch LS (not shown). The high side switch HS and the low side switch are NMOS transistors. The high side switch HS and the low side switch LS includes a source terminal, a drain terminal and a gate/control terminal.

The source terminal of the high side switch HS is coupled to the drain terminal of the low side switch SW. The drain terminal of the high side switch HS is connected to the output node VOUT of the DC-DC converter. The gate terminal of the high side switch HS receives the control signal from the self-timed gate controller 240. Similarly, the source terminal of the low side switch LS is coupled to a ground potential GND of the DC-DC converter. The gate terminal of the low side switch LS receives the control signal from a PWM generator 230.

In some embodiments, the high side switch HS is a PMOS transistor and the low side switch is the NMOS transistor, thus the type of transistor used as the high side switch HS is not limited in this disclosure.

The PWM generator 230 is configured to receive the error signal Vc and generates a high side pulse width modulation signal PWM HS and a low side pulse width modulation signal PWM LS. The high side pulse width modulation signal PWM HS is to drive the high side switch HS and the low side pulse width modulation signal PWM LS is to drive the low side switch LS.

The self-time gate controller 240 is configured to receive the high side pulse width modulation signal PWM HS from the PWM generator 230 and generates a turn-on time signal PWM HS1 to the high side switch HS.

Based on controlling the turn-on time signal PWM HS1 of the high side switch HS by the self-time gate controller 240, a dead-time of the DC-DC converter 200 is minimized, thus improving the efficiency of the DC-DC converter by reducing an overshoot and an undershoot switching loss during a power MOS switching.

Figure 3:
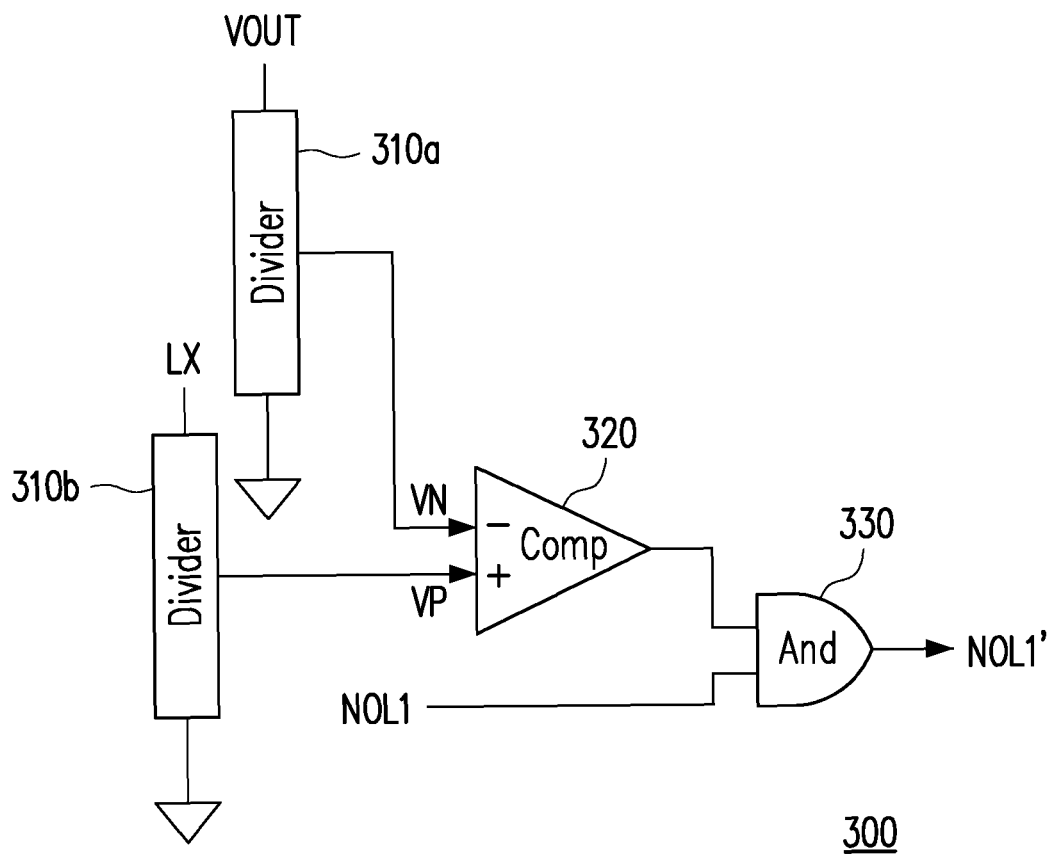
FIG. 3 illustrates a schematic circuit diagram of a self-timed gate controller according to an exemplary embodiment of the disclosure.

FIG. 3 illustrates a schematic circuit diagram of a self-timed gate controller according to an exemplary embodiment of the disclosure. The self-timed gate controller 300 may presented as the self-timed gate controller 150 in FIG. 1 and the the self-timed gate controller 240 in FIG. 2. The self-timed gate controller 300 includes a plurality of voltage dividers (310a, 310b), a comparator 320, and a logic gate 330. It is noted that, the self-timed gate controller 300 is same as the self-timed gate controller 150 in FIG. 1, thus the elements in self-timed gate controller 300 have a same reference number as the self-timed gate controller 150 in FIG. 1.

The voltage dividers (310a, 310b) includes a first voltage divider 310a and a second voltage divider 310b.

In one embodiment, the first voltage divider 310a and the second voltage divider 310b are resistive voltage dividers.

In one embodiment, the first voltage divider 310a and the second voltage divider 310b are capacitive voltage dividers.

In some embodiments, the first voltage divider 310a is the resistive voltage divider and the second voltage divider 310b is the capacitive voltage divider and vice versa, thus the type of voltage dividers (310a, 310b) used in this disclosure is not limited thereto.

With reference to FIG. 1, the voltage dividers (310a, 310b) are configured to perform a voltage division on an output node VOUT and an inductor switching node LX of a DC-DC converter to generate a first voltage VN and a second voltage VP. In detail, the first voltage divider 310a is configured to perform the voltage division on the output node of the DC-DC converter to generate the first voltage VN and the second voltage divider 310b is configured to perform the voltage division on the inductor switching node LX to generate the second voltage VP.

The comparator 320 is configured to compare the first voltage VN and the second voltage VP to generate a turn-on time signal NOL1' of the high side switch HS according to a comparison result.

The turn-on time signal NOL1' of the high side switch SW is generated when the second voltage VP is higher than the first voltage VN. In detail, the turn-on time signal NOL1' of the high side switch HS is generated when a voltage at the inductor switching node LX is greater than the product of a voltage at the output node VOUT of the DC-DC converter and a predetermined value. The turn-on time signal of the high side switch HS is calculated as, $$VOUT*(X/Z)=VN \rightarrow \quad (1)$$

$$LX*(Y/Z)=VP \rightarrow \quad (2)$$

$$VP>VN, HS \text{ turns on} \rightarrow \quad (3)$$

$$LX>VOUT*(X/Y), HS \text{ turns on} \rightarrow \quad (4)$$

Equation (1), shows that the first voltage divider 310a performs the voltage division on the output node VOUT and generates the first voltage VN. The first voltage VN is generated by the product of the voltage at the output node VOUT and the first preset value (X/Z). The first preset value (X/Z) is a user-defined value and are determined according to the specification of the DC-DC converter.

Similarly, equation (2), shows that the second voltage divider 310b performs the voltage division on the inductor switching node LX and generates the second voltage VP. The second voltage VP is generated by the product of the voltage at the inductor switching node LX and the second preset value (Y/Z). The second preset value (Y/Z) is a user-defined value and are determined according to the specification of the DC-DC converter.

After generating the first voltage VN and the second voltage VP, the comparator 320 compares the first voltage VN and the second voltage VP, when the second voltage VP is higher is than the first voltage VN, the comparator generates a comparison result (i.e., logic high "1") to the logic circuit 330 as shown in equation (3). On the other hand, when the second voltage VP is less than the or equal to the first voltage VN, the comparator generates the comparison result (i.e., logic low "0") to the logic circuit 230.

Equation (4), shows that the high side switch HS is turned on, when the voltage at the inductor switching node LX is higher than the product of the voltage at the output node VOUT and the predetermined value (X/Y). The predetermined value (X/Y) is a user-defined value and are determined according to the specification of the DC-DC converter.

For example, in one embodiment, the value of X, Y and Z is determined to 2, 4 and 32.

In some embodiments, the ratio of X and Y is determined to be 30% to 70%, thus the value of X, Y, and Z to determine the first preset value, the second preset value and the predetermined value is not limited in this disclosure.

The logic circuit 330 is configured to receive the comparison result from the comparator 320 and a first non-overlap signal NOL1 from the DC-DC converter to generate the turn-on time signal NOL1' of the high side switch HS.

In this embodiment, the logic circuit 330 is a 2 input AND gate.

In some embodiments, the logic circuit 330 may be AND gate, OR gate, NOT gate, EXOR, EXNOR, Flip flops, and so on. Hence the type of logic circuit 330 used in this disclosure is not limited thereto.

By using the voltage dividers to sense a percentage of the inductor switching node LX and comparing a percentage of the output node VOUT to determine the turn-on time signal NOL1' of the high side switch HS, the dead-time of the DC-DC converter is minimized, thus improving the efficiency of the DC-DC converter by reducing an overshoot and an undershoot switching loss during a power MOS switching.

Figure 4:
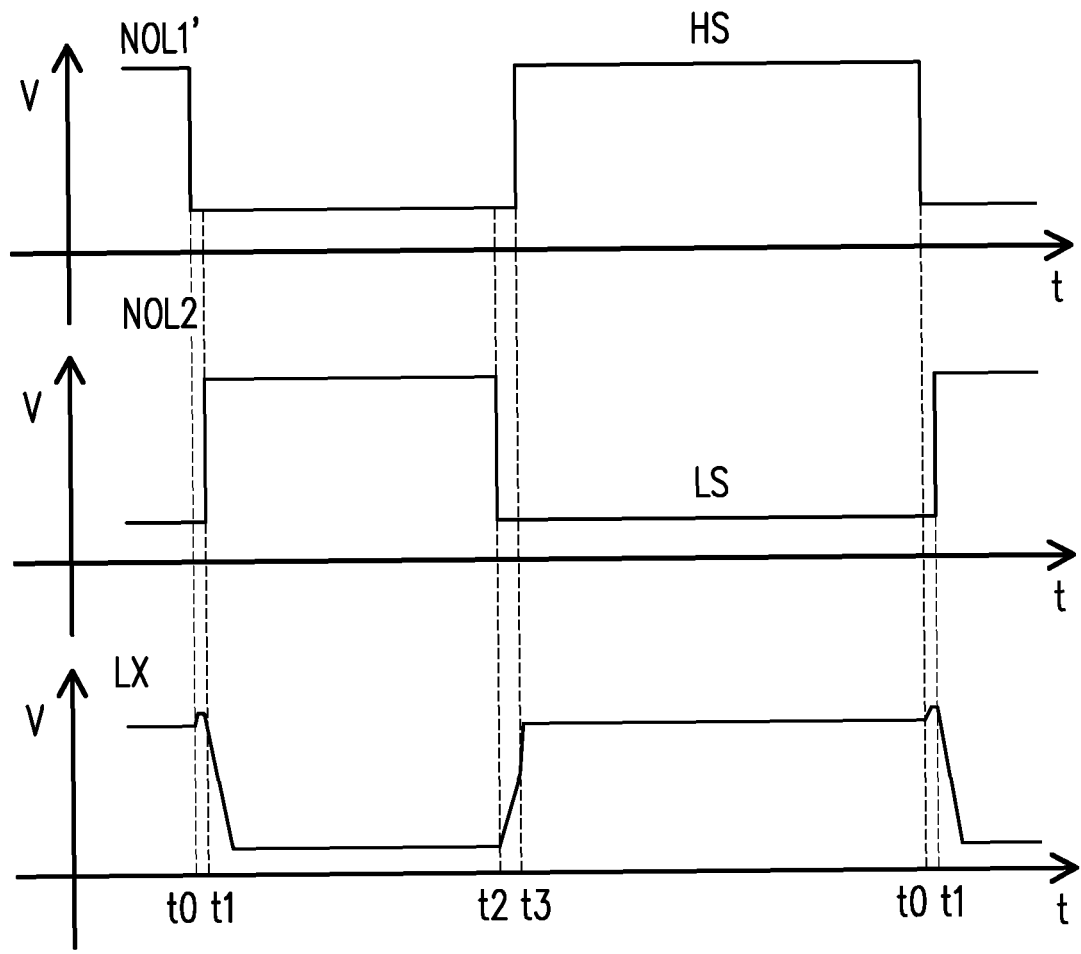
FIG. 4 illustrates operation waveforms of a DC-DC converter according to an exemplary embodiment of the disclosure.

FIG. 4 illustrates operation waveforms of a DC-DC converter according to an exemplary embodiment of the disclosure. As shown in FIG. 1, FIG. 2, and FIG. 3, when an output node VOUT reaches a target value and sensing by an error amplifier 220, a high side switch HS is turned-off and a low side switch LS is turned-on in the time t0-t1. During this condition, a body diode conduction time and an overshoot voltage of an inductor switching node LX in the time t0-t1, is minimized by the non-overlap circuit 140.

It is noted that, the operation waveforms of the DC-DC converter is same as the DC-DC converter (100, 200) in FIG. 1 and FIG. 2, thus the operation waveforms of the DC-DC converter have a same reference number as the DC-DC converter (100, 200) in FIG. 1 and FIG. 2.

Similarly, when the output node VOUT is lower than the target value and sensing by the error amplifier 220, the low side switch LS is turned-off and the high side switch HS is turned-on at the time t2-t3. The turn-on time signal NOL1' of the high side switch HS is controlled by the self-timed gate controller 300. The self-timed gate controller 300 generates the turn-on time signal NOL1' of the high side switch HS with reference to the equation (1)-(4).

Based on the above, the dead-time during the load transition in the DC-DC converter is minimized, thereby reducing the overshoot voltage and an undershoot voltage at the inductor switching node LX is achieved.

Figure 5:
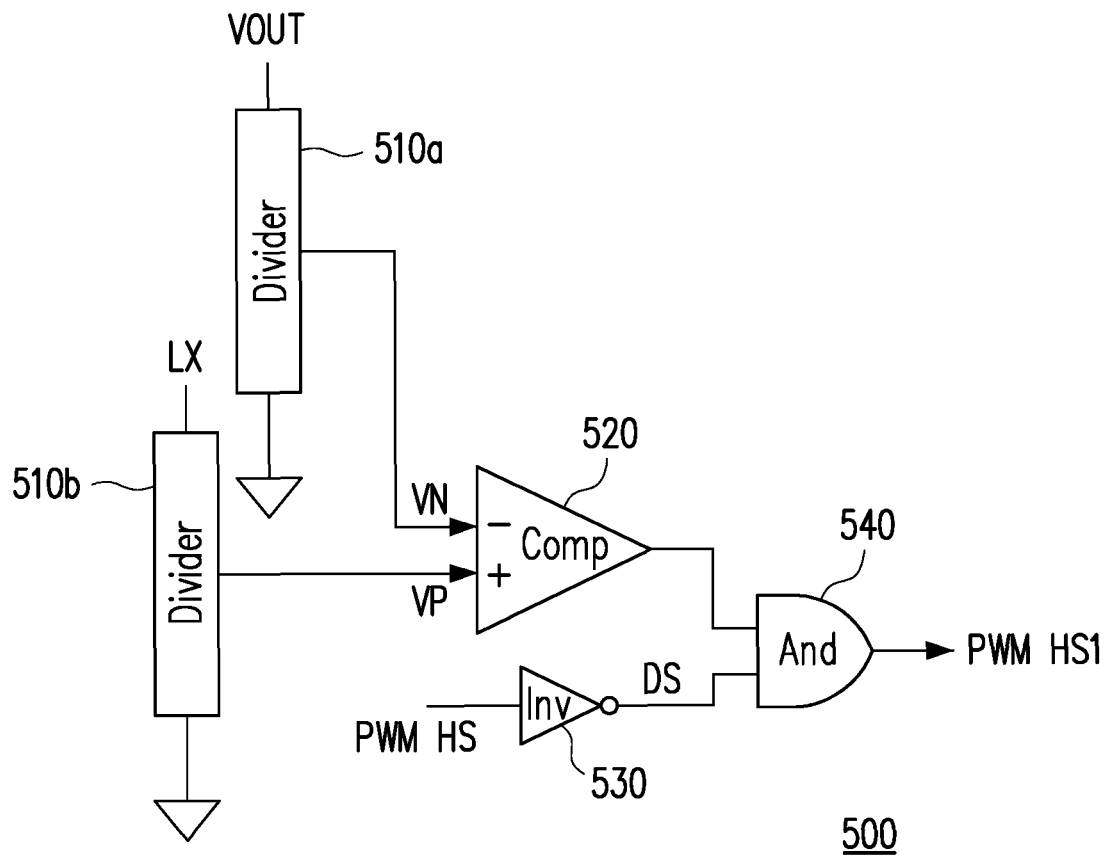
FIG. 5 illustrates a schematic circuit diagram of a self-timed gate controller according to another exemplary embodiment of the disclosure.

FIG. 5 illustrates a schematic circuit diagram of a self-timed gate controller according to another exemplary embodiment of the disclosure. The self-time gate controller 500 includes a plurality of voltage dividers (510a, 510b), a comparator 520, an inverter 530, and a logic gate 540. It is noted that, the self-timed gate controller 500 is same as the self-timed gate controller 240 in FIG. 2, thus the elements in self-timed gate controller 500 have a same reference number as the self-timed gate controller 240 in FIG. 2.

The voltage dividers (510a, 510b) includes a first voltage divider 510a and a second voltage divider 510b. The first voltage divider 510a and the second voltage divider 510b are respectively similar to a first voltage divider 310a and a second voltage divider 310b with reference to FIG. 3, thus the detailed description of the first voltage divider 510a and the second voltage divider 510b are omitted herein.

With reference to FIG. 1 and FIG. 2, the voltage dividers (510a, 510b) are configured to perform a voltage division on an output node VOUT and an inductor switching node LX of a DC-DC converter to generate a first voltage VN and a second voltage VP. In detail, the first voltage divider 510a is configured to perform the voltage division on the output node of the DC-DC converter to generate the first voltage VN and the second voltage divider 510b is configured to perform the voltage division on the inductor switching node LX to generate the second voltage VP.

The comparator 520 is respectively similar to a comparator 320 with reference to FIG. 3, thus the detailed description of the comparator 520 are omitted herein.

The inverter 530 is configured to receive a high side pulse width modulation signal PWM HS from a pulse width generator 230 to generate a delay signal DS to the logic circuit 540.

In this embodiment, the number of inverters 530 in the self-timed gate controller 500 is one.

In some embodiments, the number of inverters 530 in the self-timed gate controller 500 is N, where N is chosen to be odd number of inverters (for e.g., N=1, 3, 5, 7 . . . ), thus the number of inverters in the self-timed gate controller 500 is not limited in this disclosure.

The logic circuit 540 is configured to receive a comparison result from the comparator 520 and the delay signal DS from the inverter 530 to generate the turn-on time signal PWM HS1 of the high side switch HS.

The logic circuit 530 is respectively similar to a logic circuit 330 with reference to FIG. 3, thus the detailed description of the logic circuit 530 are omitted herein.

Figure 6:
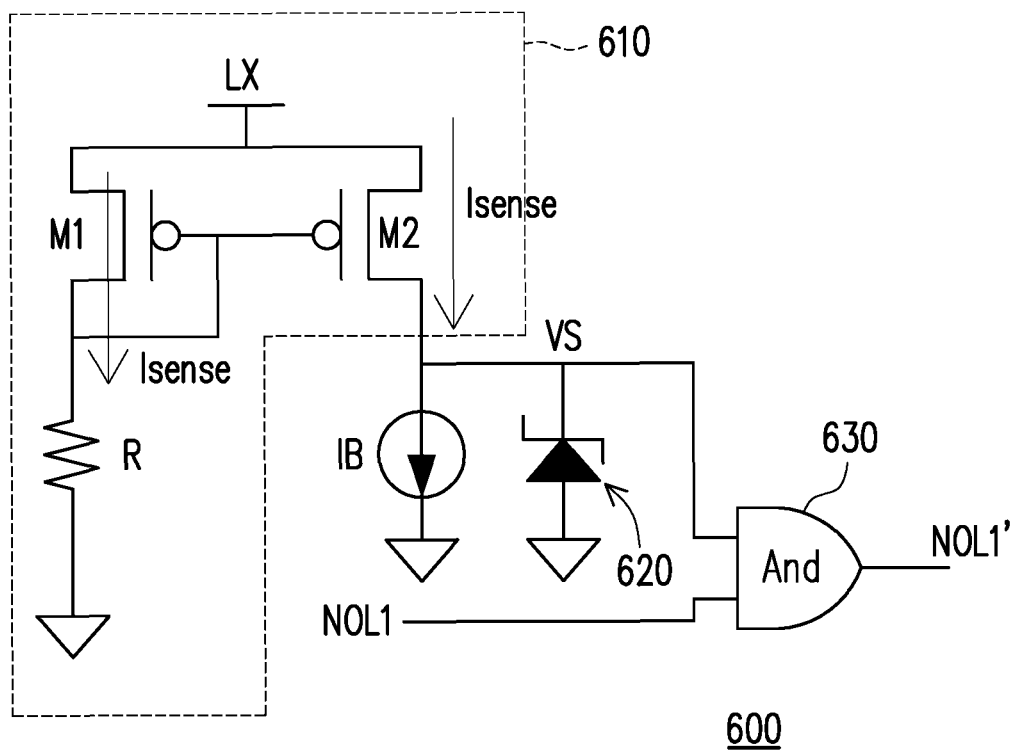
FIG. 6 illustrates a schematic circuit diagram of a self-timed gate controller according to an exemplary embodiment of the disclosure.

FIG. 6 illustrates a schematic circuit diagram of a self-timed gated controller according to an exemplary embodiment of the disclosure. The self-timed gate controller 600 includes a current mirror 610, a diode 620, and a logic circuit 630.

In one embodiment, the self-timed gate controller 600 is same as the self-timed gate controller 150 in FIG. 1.

In one embodiment, the self-timed gate controller 600 is same as the self-timed gate controller 240 in FIG. 2, thus the elements in self-timed gate controller 600 have a same reference number as the self-timed gate controller 240 in FIG. 2.

The current mirror 610 includes a first transistor M1, a second transistor M2, and a resistor R. The first transistor M1 has a source terminal, a drain terminal and a gate/control terminal. Similarly, the second transistor M2 includes a source terminal, a drain terminal and a gate/control terminal. The resistor R has a first terminal and a second terminal.

In this embodiment, the first transistor M1 and the second transistor M2 is P-MOS transistor.

With reference to FIG. 1 and FIG. 2, the source terminal of the first transistor M1 is connected to an inductor switching node LX of the DC-DC converter. The drain terminal of the first transistor M1 is connected to the first terminal of the resistor R. The control terminal of the first transistor M1 is connected to the control terminal of the second transistor M2 and the drain terminal of the first transistor M1.

Similarly, the source terminal of the second transistor M2 is connected to an inductor switching node LX of the DC-DC converter. The drain terminal of the second transistor M2 is connected to an output current IB of the current mirror 610, which is an output node of the current mirror 610. The control terminal of the second transistor M2 is coupled to the control terminal of the first transistor M1.

The first terminal of the resistor R is coupled to the drain terminal of the first transistor M1 and the second terminal of the resistor R is coupled to a ground potential GND.

The output current IB as a current source is coupled to the output terminal of the second transistor M2 and the ground potential GND.

In another embodiment, the first transistor M1 and the second transistor M2 is N-MOS transistor, the circuit configuration of the first transistor M1, the second transistor M2 and the resistor R are altered according to the N-MOS current mirror, thus the type of current mirror 610 is not limited in this disclosure.

The diode 620 includes a first terminal and a second terminal. The first terminal is a cathode terminal and the second terminal is an anode terminal. The first terminal is coupled to an output node VS. The output node Vs is coupled to the output current IB of the current mirror 610.

The current mirror 610 is configured to sense a first current $I_{SENSE}$ on an inductor switching node LX of the DC-DC converter and compares the first current $I_{SENSE}$ and the output current IB to generate a turn-on time signal of the high side switch SW according to a comparison result. The comparison result is sensed at the output node VS.

The turn-on time signal of the high side switch SW is generated when the first current $I_{SENSE}$ is higher than the output current IB. The turn-on time signal of the high side switch HS is calculated as, $$I_{SENSE}=LX/R \rightarrow \quad (5)$$

$$I_{SENSE}>IB, VS \text{ goes to high and } HS \text{ turns on} \rightarrow \quad (6)$$

$$LX>IB*R, HS \text{ turns on} \rightarrow \quad (7)$$

Equation (5), shows that the first current $I_{SENSE}$ is generated by the dividing the voltage at the inductor switching node LX and the resistor R. After generating the first current $I_{SENSE}$, the first current $I_{SENSE}$ is compared with the output current IB, when the first current $I_{SENSE}$ is higher than the output current IB, the output node VS clamps to a power supply voltage VDD (i.e., logic high "1") as the comparison result shown in equation (6).

Equation (7), shows that the high side switch HS is turned on, when the voltage at the inductor switching node LX is higher than the product of the output current IB and the resistance R.

The logic circuit 630 is similar to a logic circuit 330 with reference to FIG. 3, thus the detailed description of the logic circuit 630 is omitted herein.

With reference to FIG. 3, the logic circuit 630 is configured to receive the comparison result from the output node VS and a first non-overlap signal NOL1 from the non-overlap circuit 330 to generate a turn-on time signal NOL1' of the high side switch HS.

With reference to FIG. 5, the logic circuit 630 is configured to receive the comparison result from the output node Vs and a delay signal DS from the inverter 530 to generate a turn-on time signal PWM HS1 of the high side switch HS. By using the current mirror 610 to sense the percentage of the inductor switching node LX and comparing the inductor sensing current with the output current to determine the turn-on time signal of the high side switch HS, the dead-time of the DC-DC converter is minimized, thus improving the efficiency of the DC-DC converter by reducing an overshoot and an undershoot switching loss during power MOS switching.

Figure 7:
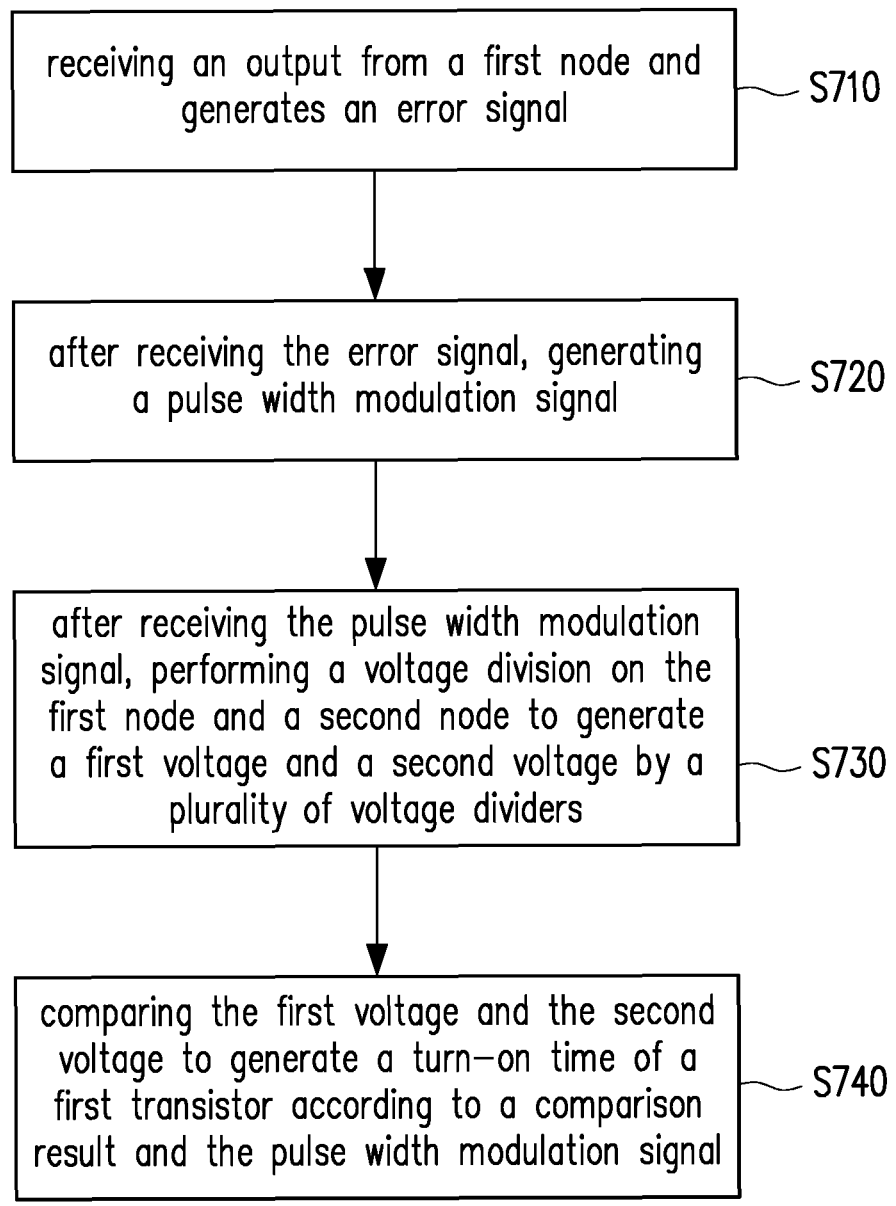
FIG. 7 illustrates a flowchart to illustrate a DC-DC converter operation method according to an exemplary embodiment of the disclosure.

FIG. 7 illustrates a flowchart to illustrate a DC-DC converter operation method includes receiving an output from a first node and generates an error signal in step S710. In specific, with reference to FIG. 1 and FIG. 2, receiving the output from an output node VOUT, is also known as the first node of the DC-DC converter 100 by the error amplifier 120. The error amplifier 120 is configured to generate the error signal Vc based on the output of the DC-DC converter 100. The error signal Vc is delivered to a PWM generator 130. After receiving the error signal Vc by the PWM generator 130, the PWM generator 130 generates a pulse width modulation signal PWM in step S720.

With reference to FIG. 2, after receiving the error signal Vc by the PWM generator 230, the PWM generator 230 generates a high side pulse width modulation signal PWM HS and a low side pulse width modulation signal PWM LS.

After receiving the pulse width modulation signal PWM from the PWM generator 130, performing a voltage division on a first node and a second node to generate a first voltage and a second voltage by a plurality of voltage dividers in step S730. In detail, performing the voltage division on the output node VOUT and an inductor switching node LX of a DC-DC converter (100, 200) to generate the first voltage VN and the second voltage VP by a plurality of voltage dividers (310a, 310b) in a self-timed gate controller with reference to FIG. 1, FIG. 2 and FIG. 3.

After generating the first voltage VN and the second voltage VP, the comparing the first voltage and the second voltage to generate a turn-on time signal of a first transistor according to a comparison result and the high side pulse width modulation signal PWM HS in step S740.

In detail, after generating the first voltage VN and the second voltage VP, a comparator 320 is configured to compare the first voltage VN and the second voltage VP and generates a turn-on time signal NOL1' of the high side switch HS according to the comparison result from the comparator 320 and the high side pulse width modulation signal PWM HS with reference to FIG. 1 and FIG. 3.

The turn-on time signal NOL1' of the first transistor HS is generated when the second voltage VP is higher than the first voltage VN. In specific, the turn-on time signal NOL1' of the first transistor HS is generated when a voltage at the inductor switching node LX is greater than the product of a voltage at the output node VOUT of the DC-DC converter 100 and a predetermined value.

It is noted that, a logic circuit 330 is configured to receive the comparison result from the comparator 320 and a first non-overlap signal NOL1 from the DC-DC converter 100 to generate the turn-on time signal NOL1' of the high side switch HS.

In some embodiments, the comparator 320 is configured to compare the first voltage VN and the second voltage VP and generates a turn-on time signal PWM HS1 of the high side switch HS according to the comparison result from the comparator 320 and the pulse width modulation signal PWM HS with reference to FIG. 2 and FIG. 3.

The turn-on time signal PWM HS1 of the first transistor HS is generated when the second voltage VP is higher than the first voltage VN. In specific, the turn-on time signal PWM HS1 of the first transistor HS is generated when a voltage at the inductor switching node LX is greater than the product of a voltage at the output node VOUT of the DC-DC converter and a predetermined value.

It is noted that, a logic circuit 330 is configured to receive the comparison result from the comparator 320 and a high side pulse width modulation signal PWM HS from the DC-DC converter 200 to generate the turn-on time signal PWM HS1 of the high side switch HS.

Based on the controlling the turn-on time signal of the high side switch by the self-time gate controller, the dead-time of the DC-DC converter is minimized, thus improving the efficiency of the DC-DC converter by reducing an overshoot and an undershoot switching loss during a power MOS switching.

Figure 8:
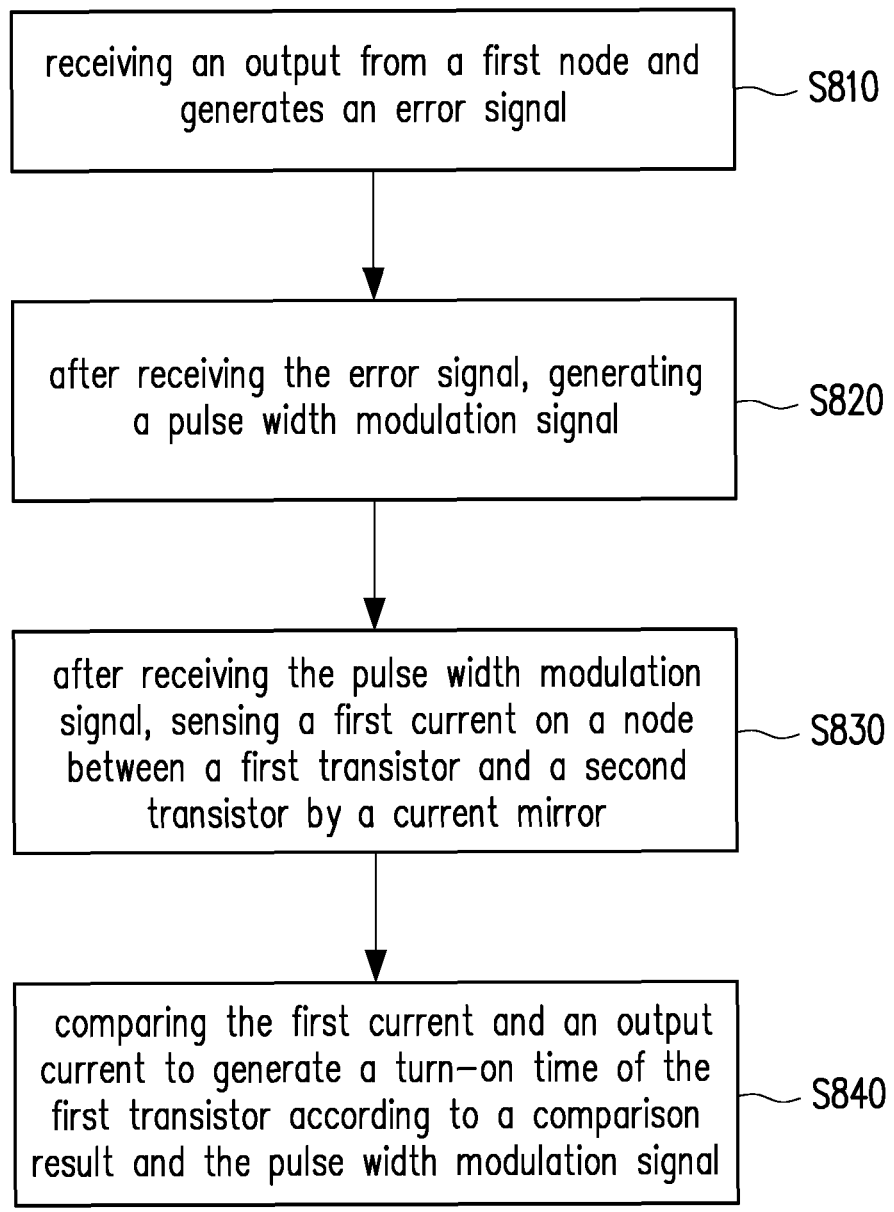
FIG. 8 illustrates a flowchart to illustrate a DC-DC converter operation method according to an exemplary embodiment of the disclosure.

FIG. 8 illustrates a flowchart to illustrate a DC-DC converter operation method includes receiving an output from a first node and generates an error signal in step S810. In specific, with reference to FIG. 1 and FIG. 2, receiving the output from an output node VOUT, is also known as the first node of the DC-DC converter 100 by an error amplifier 120. The error amplifier 120 is configured to generate the error signal Vc based on the output of the DC-DC converter 100. The error signal Vc is delivered to a PWM generator 130. After receiving the error signal Vc, by the PWM generator 130, the PWM generator 130 generates a pulse width modulation signal PWM in step S820.

With reference to FIG. 2, after receiving the error signal Vc by the PWM generator 230, the PWM generator 230 generates a high side pulse width modulation signal PWM HS and a low side pulse width modulation signal PWM LS.

After receiving the pulse width modulation signal PWM from the PWM generator 130, sensing a first current on a node between a first transistor and a second transistor by a current mirror in step S830.

In detail, sensing the first current $I_{SENSE}$ on an inductor switching node LX of the DC-DC converter (100, 200) by the current mirror 610 with reference to FIG. 1, FIG. 2, and FIG. 6.

After sensing the first current $I_{SENSE}$ on an inductor switching node LX, comparing the first current and an output current to generate a turn-on time signal of the first transistor according to a comparison result and the high side pulse width modulation signal PWM HS in step S840. In detail, the current comparator compares the first current $I_{SENSE}$ and an output current IB of the current mirror 610 to generate a turn-on time signal of the first transistor according to a comparison result and the high side pulse width modulation signal PWM HS. The comparison result is sensed at the output node VS. It is noted that, the turn-on time signal of the first transistor is generated when the first current $I_{SENSE}$ is higher than the output current IB of the current mirror 610.

In one embodiment, comparing the first current $I_{SENSE}$ and the output current IB of the current mirror to generate the turn-on time signal NOL1' of the first transistor HS of the DC-DC converter 100 with reference to FIG. 1 and FIG. 6.

In one embodiment, comparing the first current $I_{SENSE}$ and the output current IB of the current mirror to generate the turn-on time signal PWM HS1 of the first transistor HS of the DC-DC converter 200 with reference to FIG. 2 and FIG. 6. In specific, the logic circuit 630 is configured to receive the comparison result from the output node Vs and a delay signal DS from the inverter 530 to generate a turn-on time signal PWM HS1 of the high side switch HS.

By using the current mirror 610 to sense the percentage of the inductor switching node LX and comparing the inductor sensing current with the output current to determine the turn-on time signal of the high side switch HS, the dead-time of the DC-DC converter is minimized, thus improving the efficiency of the DC-DC converter by reducing an overshoot and an undershoot switching loss during power MOS switching.

According to some embodiments of the disclosure by referring to FIG. 1, FIG. 2, FIG. 3, and FIG. 7, a DC-DC converter that includes a self-timed gate controller and a method. The self-time gate controller 300 includes a plurality of voltage dividers (310a, 310b), a comparator 320, and a logic gate 330. The voltage dividers (310a, 310b) includes a first voltage divider 310a and a second voltage divider 310b. The voltage dividers (310a, 310b) are configured to perform a voltage division on an output node VOUT and an inductor switching node LX of a DC-DC converter to generate a first voltage VN and a second voltage VP. In detail, the first voltage divider 310a is configured to perform the voltage division on the output node of the DC-DC converter to generate the first voltage VN and the second voltage divider 310b is configured to perform the voltage division on the inductor switching node LX to generate the second voltage VP. The comparator 320 is configured to compare the first voltage VN and the second voltage VP to generate a turn-on time signal of the high side switch HS according to a comparison result. The turn-on time signal of the high side switch SW is generated when the second voltage VP is higher than the first voltage VN. In detail, the turn-on time signal of the high side switch HS is generated when a voltage at the inductor switching node LX is greater than the product of a voltage at the output node VOUT of the DC-DC converter and a predetermined value. The high side switch HS turn-on time signal is calculated based on equation (1)-(4). With reference to FIG. 1, the logic circuit 330 is configured to receive the comparison result from the comparator 320 and a first non-overlap signal NOL1 from the DC-DC converter to generate the turn-on time signal of the high side switch HS. With reference to FIG. 2 and FIG. 5, the logic circuit 540 is configured to receive a comparison result from the comparator 520 and the delay signal DS from the inverter 530 to generate the turn-on time signal of the high side switch HS. The DC-DC converter operation method includes receiving an output from a first node and generates an error signal in step S710. After receiving the error signal Vc generating a pulse width modulation signal in step S720. After receiving the pulse width modulation signal, performing a voltage division on a first node and a second node to generate a first voltage and a second voltage by a plurality of voltage dividers in step S730. In step 740, comparing the first voltage and the second voltage to generate a turn-on time signal of a first transistor according to a comparison result. The turn-on time signal of the first transistor is generated when the second voltage is higher than the first voltage. The turn-on time signal of the first transistor is generated when a voltage at the second node is higher than the product of a voltage at the first node and a predetermined value. By using the voltage dividers to sense the percentage of the inductor switching node LX and comparing the percentage of the output node VOUT to determine the turn-on time signal of the high side switch HS, the dead-time of the DC-DC converter is minimized, thus improving the efficiency of the DC-DC converter by reducing an overshoot and an undershoot switching loss during power MOS switching.

According to some embodiments of the disclosure by referring to FIG. 1, FIG. 2, FIG. 5, and FIG. 7 a DC-DC converter that includes a self-timed gate controller device and a method. The self-time gate controller 500 includes a plurality of voltage dividers (510a, 510b), a comparator 520, an inverter 530, and a logic gate 540. The voltage dividers (510a, 510b) are configured to perform a voltage division on an output node VOUT and an inductor switching node LX of a DC-DC converter to generate a first voltage VN and a second voltage VP. In detail, the first voltage divider 510a is configured to perform the voltage division on the output node of the DC-DC converter to generate the first voltage VN and the second voltage divider 510b is configured to perform the voltage division on the inductor switching node LX to generate the second voltage VP. The inverter 530 is configured to receive a high side pulse width modulation signal PWM HS from a pulse width generator 230 to generate a delay signal DS to the logic circuit 540. The logic circuit 540 is configured to receive a comparison result from the comparator 520 and the delay signal DS from the inverter 530 to generate the turn-on time signal of the high side switch HS. The DC-DC converter operation method includes receiving an output from a first node and generates an error signal in step S710. After receiving the error signal Vc generating a pulse width modulation signal in step S720. After receiving the pulse width modulation signal, performing a voltage division on a first node and a second node to generate a first voltage and a second voltage by a plurality of voltage dividers in step S730. In step S740, comparing the first voltage and the second voltage to generate a turn-on time signal of a first transistor according to a comparison result. The turn-on time signal of the first transistor is generated when the second voltage is higher than the first voltage. The turn-on time signal of the first transistor is generated when a voltage at the second node is higher than the product of a voltage at the first node and a predetermined value. By using the voltage dividers to sense the percentage of the inductor switching node LX and comparing the percentage of the output node VOUT to determine the turn-on time signal of the high side switch HS, the dead-time of the DC-DC converter is minimized, thus improving the efficiency of the DC-DC converter by reducing an overshoot and an undershoot switching loss during power MOS switching.

According to some embodiments of the disclosure by referring to FIG. 1, FIG. 2, FIG. 6, and FIG. 8 a DC-DC converter that includes a self-timed gate controller device and a method. The self-timed gate controller 600 includes a current mirror 610, a diode 620, and a logic circuit 630. The current mirror 610 includes a first transistor M1, a second transistor M2, and a resistor R. The first transistor M1 has a source terminal, a drain terminal and a gate/control terminal. Similarly, the second transistor M2 includes a source terminal, a drain terminal and a gate/control terminal. The resistor R has a first terminal and a second terminal. The source terminal of the first transistor M1 is connected to an inductor switching node LX of the DC-DC converter. The drain terminal of the first transistor M1 is connected to the first terminal of the resistor. The control terminal of the first transistor M1 is connected to the control terminal of the second transistor M2 and the drain terminal of the first transistor M1. Similarly, the source terminal of the second transistor M2 is connected to an inductor switching node LX of the DC-DC converter. The drain terminal of the second transistor M2 is connected to an output current IB of the current mirror 610. The control terminal of the second transistor M2 is coupled to the control terminal of the first transistor M1.

The first terminal of the resistor R is coupled to the drain terminal of the first transistor M1 and the second terminal of the resistor R is coupled to a ground potential GND. The output current IB as a current source is coupled to the output terminal of the second transistor M2 and the ground potential GND. The diode 620 includes a first terminal and a second terminal. The first terminal is a cathode terminal and the second terminal is an anode terminal. The first terminal is coupled to an output node Vs. The output node Vs is coupled to the output current IB of the current mirror 610. The current mirror 610 is configured to sense a first current $I_{SENSE}$ on an inductor switching node LX of the DC-DC converter and compares the first current $I_{SENSE}$ and the output current IB to generate a turn-on time signal of the high side switch SW according to a comparison result. The comparison result is sensed at the output node Vs. The turn-on time signal of the high side switch SW is generated when the first current $I_{SENSE}$ is higher than the output current IB. The turn-on time signal of the high side switch HS is calculated based on equation (5)-(7). The logic circuit 530 is configured to receive the comparison result from the output node Vs and a first non-overlap signal NOL1 from the DC-DC converter to generate a turn-on time signal of the high side switch HS. With reference to FIG. 3 and FIG. 6, the logic circuit 630 is configured to receive the comparison result from the output node Vs and a first non-overlap signal NOL1 from the non-overlap circuit 330 to generate a turn-on time signal of the high side switch HS. With reference to FIG. 5 and FIG. 6, the logic circuit 630 is configured to receive the comparison result from the output node Vs and a delay signal DS from the inverter 530 to generate a turn-on time signal of the high side switch HS. The DC-DC converter operation method includes receiving an output from a first node and generates an error signal in step S810. After receiving the error signal Vc generating a pulse width modulation signal in step S820. After receiving the pulse width modulation signal, sensing a first current on a node between a first transistor and a second transistor by a current mirror in step S830. In step S840, comparing the first current and an output current to generate a turn-on time of the first transistor according to a comparison result. The turn-on time signal of the first transistor is generated when the first current is higher than the output current. By using the current mirror to sense the percentage of the inductor switching node LX and comparing the inductor sensing current with the output current to determine the turn-on time signal of the high side switch HS, the dead-time of the DC-DC converter is minimized, thus improving the efficiency of the DC-DC converter by reducing an overshoot and an undershoot switching loss during power MOS switching.

According to some embodiments, the disclosure provides a DC-DC converter. The DC-DC converter includes a power stage, an error amplifier, a pulse width modulation (PWM) generator, and a self-timed gate controller. The power stage includes a first transistor and a second transistor. The power stage is configured to generate an output at a first node. The error amplifier is configured to receive the output from the first node and generates an error signal. The PWM generator is configured to receive the error signal from the error amplifier and generates a pulse width modulation signal. The self-timed gate controller includes a plurality of voltage dividers and a comparator. The voltage dividers are configured to perform a voltage division on the first node and a second node to generate a first voltage and a second voltage. The first node is an output node of the DC-DC converter and the second node is a node between the first transistor and the second transistor of the DC-DC converter. The comparator is configured to compare the first voltage and the second voltage to generate a turn-on time signal of the first transistor according to a comparison result.

According to some embodiments, the disclosure provides a DC-DC converter operation method includes: receiving an output from a first node and generates an error signal; after receiving the error signal, after receiving the pulse width modulation signal, generating a pulse width modulation signal; performing a voltage division on the first node and a second node to generate a first voltage and a second voltage by a plurality of voltage dividers; and comparing the first voltage and the second voltage to generate a turn-on time signal of a first transistor according to a comparison result and the pulse width modulation signal.

According to some embodiments, the disclosure provides a DC-DC converter. The DC-DC converter includes a power stage, an error amplifier, a pulse width modulation (PWM) generator, and a gate controller. The power stage includes a first transistor and a second transistor configured to generate an output at a first node. The gate controller includes a current mirror. The current mirror is configured to sense a first current on a node between a first transistor and a second transistor of the DC-DC converter and compares the first current and an output current to generate a turn-on time signal of the first transistor according to a comparison result.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A DC-DC converter comprising:
   a power stage, comprising a first transistor and a second transistor, wherein the power stage is configured to generate an output at a first node;
   an error amplifier, configured to receive the output from the first node and generates an error signal;
   a pulse width modulation (PWM) generator, configured to receive the error signal from the error amplifier and generates a pulse width modulation signal; and
   a gate controller comprising:
      a first voltage divider, configured to perform a voltage division on the first node and a ground potential to generate a first voltage, wherein the first node is an output node of the DC-DC converter;
      a second voltage divider, configured to perform a voltage division on a second node and the ground potential to generate a second voltage, wherein the second node is a node between the first transistor and the second transistor of the DC-DC converter;
      a comparator, configured to compare the first voltage and the second voltage to generate a turn-on time signal of the first transistor according to a comparison result; and
      a logic circuit, configured to receive the comparison result of the comparator to generate the turn-on time signal of the first transistor.

2. The DC-DC converter of claim 1, wherein the turn-on time signal of the first transistor is generated when the second voltage is higher than the first voltage.

3. The DC-DC converter of claim 1, wherein the turn-on time signal of the first transistor is generated when a voltage at the second node is higher than a product of a voltage at the first node and a predetermined value.

4. The DC-DC converter of claim 1,
wherein the logic circuit is configured to receive the comparison result of the comparator and a first non-overlap signal from the DC-DC converter to generate the turn-on time signal of the first transistor.

5. The DC-DC converter of claim 1, further comprising:
an inverter configured to receive the first pulse width modulated signal and generates a delay signal,
wherein the logic circuit is configured to receive the comparison result of the comparator and the delay signal from the inverter to generate the turn-on time signal of the first transistor.

6. The DC-DC converter of claim 1, wherein the first transistor is a high-side power transistor of the DC-DC converter and the second transistor is a low-side power transistor of the DC-DC converter.

7. A DC-DC converter operation method comprising:
receiving an output from a first node and generates an error signal;
after receiving the error signal, generating a pulse width modulation signal;
after receiving the pulse width modulation signal, performing a voltage division on the first node and a ground potential to generate a first voltage by a first voltage divider, and performing a voltage division on a second node and the ground potential to generate a second voltage by a second voltage divider, wherein the first node is an output node of the DC-DC converter and the the second node is a node between the first transistor and the second transistor of the DC-DC converter; and
comparing the first voltage and the second voltage to generate a turn-on time signal of a first transistor according to a comparison result and the pulse width modulation signal.

8. The method of claim 7, further comprising:
generating the turn-on time signal of the first transistor when the second voltage is higher than the first voltage.

9. The method of claim 7, further comprising:
generating the turn-on time signal of the first transistor when a voltage at the second node is higher than a product of a voltage at the first node and a predetermined value.

10. The method of claim 7, further comprising:
receiving the pulse width modulation signal and generates a first non-overlap signal to the first transistor and a second non-overlap signal to the second transistor by a non-overlap circuit,
wherein the first non-overlap signal and the second non-overlap signal do not overlap each other.

11. The method of claim 7, further comprising:
receiving the comparison result and a first non-overlap signal to generate the turn-on time signal of the first transistor by a logic circuit.

12. The method of claim 7, further comprising:
receiving the pulse width modulation signal and generating a delay signal for the first transistor by an inverter; and
receiving the comparison result and the delay signal to generate the turn-on time signal of the first transistor by a logic circuit.

13. The method of claim 7, wherein the first transistor is a high side power transistor of the DC-DC converter.

14. A DC-DC converter comprising:
a power stage comprising a first transistor and a second transistor, wherein the power stage is configured to generate an output at a first node;
an error amplifier, configured to receive the output from the first node and generates an error signal;
a pulse width modulation (PWM) generator, configured to receive the error signal from the error amplifier and generates a pulse width modulation signal;
a gate controller comprising:
a current mirror, configured to sense a first current on a node between the first transistor and the second transistor of the DC-DC converter and compares the first current and an output current to generate a turn-on time signal of the first transistor according to a comparison result; and
a first diode, comprising a first terminal and a second terminal,
wherein the first terminal is coupled to an output node of the comparator and the second terminal is coupled to a ground.

15. The DC-DC converter of claim 14, wherein the turn-on time signal of the first transistor is generated when the first current is higher than the output current.

16. The DC-DC converter of claim 15, wherein when the first current is higher than the output current,
a first terminal of a diode is clamped to a first predetermined voltage to generate the turn-on time signal of the first transistor.

17. The DC-DC converter of claim 14, wherein when the second voltage is higher than the first voltage,
the first terminal of the diode is clamped to a first predetermined voltage to generate the turn-on time signal of the first transistor.

18. The DC-DC converter of claim 14, wherein the first diode is a Zener diode.

19. The DC-DC converter of claim 14, wherein the turn-on time signal of the first transistor is generated when a voltage at the node is higher than the product of a predetermined reference current and a first resistor.

* * * * *